Jan. 14, 1941.   W. B. DEAN   2,228,509
JOINT BETWEEN A TRANSVERSE UNDERFRAME BEAM AND THE SIDE
WALL OF A RAILWAY OR OTHER VEHICLE BODIES
Filed March 1, 1939   2 Sheets-Sheet 1
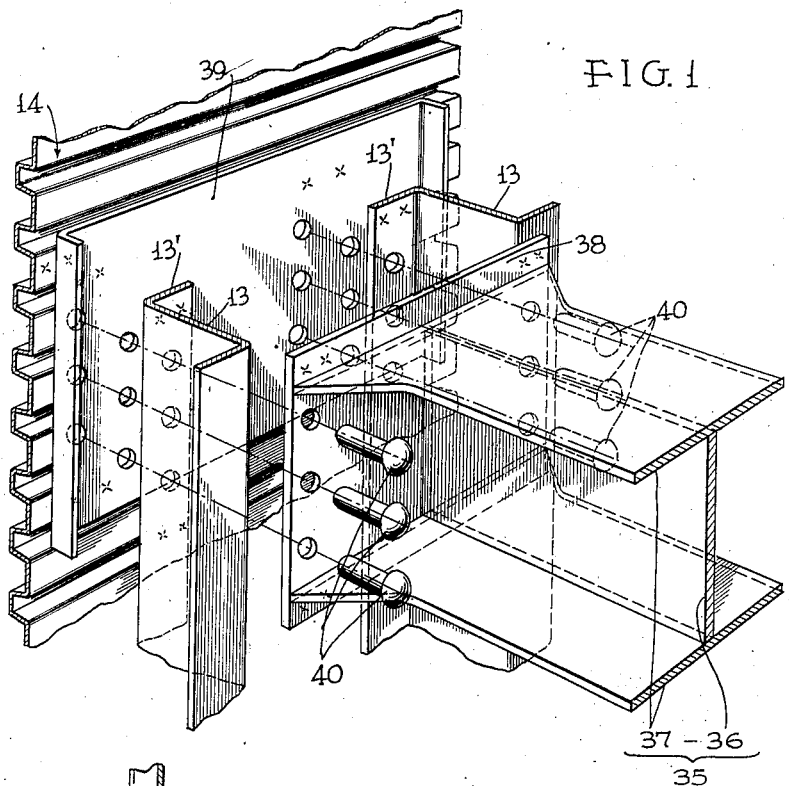
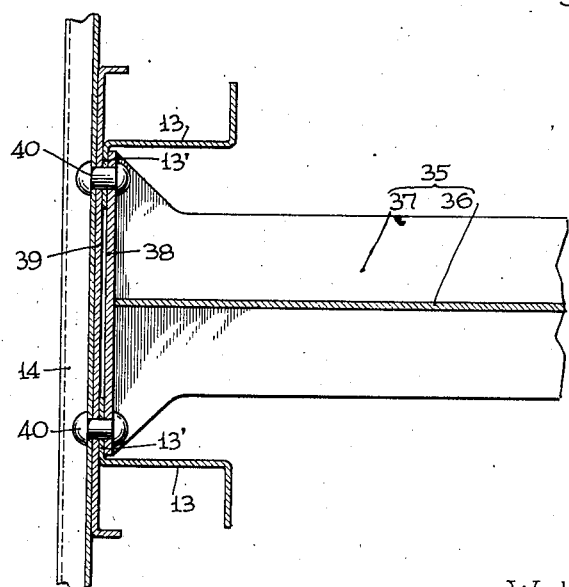
INVENTOR:
Walter B. Dean.
BY
John P. Garbox
ATTORNEY Jan. 14, 1941.　　　　　W. B. DEAN　　　　　2,228,509
JOINT BETWEEN A TRANSVERSE UNDERFRAME BEAM AND THE SIDE
WALL OF A RAILWAY OR OTHER VEHICLE BODIES
Filed March 1, 1939　　　2 Sheets-Sheet 2

INVENTOR:
Walter B. Dean
BY
John P. Tarbox
ATTORNEY

Patented Jan. 14, 1941

2,228,509

UNITED STATES PATENT OFFICE 2,228,509

JOINT BETWEEN A TRANSVERSE UNDERFRAME BEAM AND THE SIDE WALL OF RAILWAY OR OTHER VEHICLE BODIES

Walter B. Dean, Paris, France, assignor to Edward G. Budd Manufacturing Co., Philadelphia, Pa., a corporation of Pennsylvania Application March 1, 1939, Serial No. 259,083
In France April 25, 1938

8 Claims. (Cl. 105—397)

The present invention relates to a method of connection between the pivot (king pin) beams and the sides of railway vehicles, more particularly railway vehicles constructed of thin, light materials, and the different elements of which are assembled by spot welding.

The invention is characterized in that the end of each king pin (bogie or pivot) beam, said end comprising a transverse plate welded to the beam elements, is connected by means of rivets to the body uprights and to the panelling sheet metal, with the interposition of a stay plate, so that the joint produced is adapted to withstand shearing, tearing and torsional efforts at the same time, said stay plate being provided to reinforce, on the one hand, the body uprights at the points at which rivet holes are found (said uprights being weakened by the presence of these holes if said stay plate is not welded thereto) and, on the other, to panelling plates.

To methods of connecting an end of a pivot beam to the corresponding side of a railway vehicle made of thin light material (for example non-oxidisable steel) are illustrated diagrammatically and by way of example only on the accompanying drawings.

Fig. 1 is a perspective view of the different elements, shown separately, before mounting.

Fig. 2 is a cross section of the joint formed by means of the different elements shown on Fig. 1.

Figure 3:
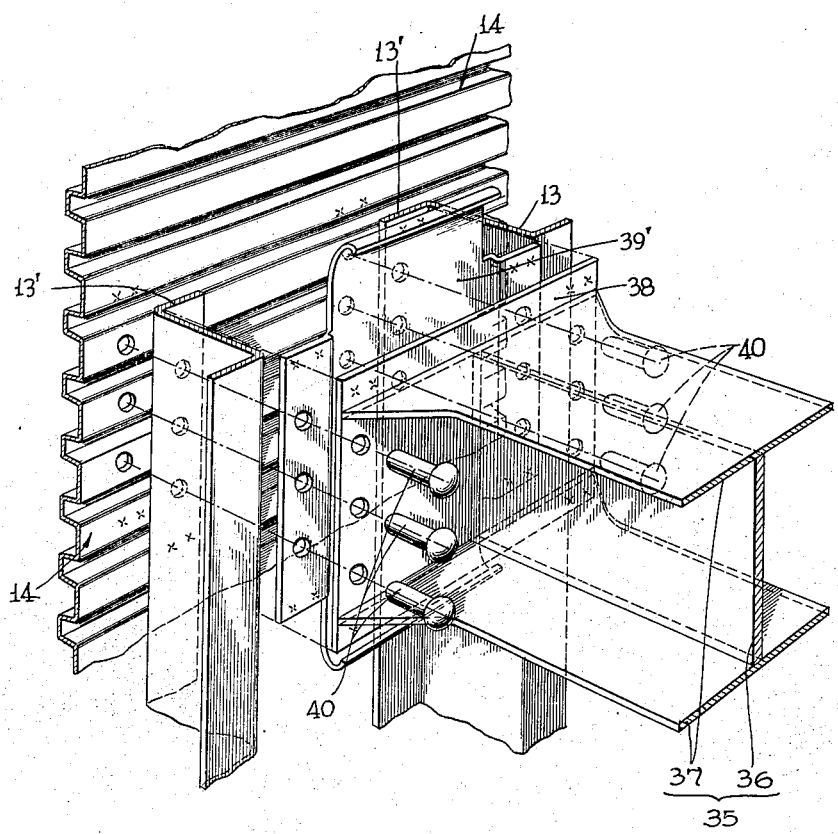
Fig. 3 is a view, similar to that of Fig. 1, of a modification.

According to the construction shown on Figs. 1 and 2 the end of the pivot beam 35 (for example, of I cross section, the lower and upper flanges of which, enlarged at the ends, are designated by 37 and the vertical web of which is designated by 38) is made integral, by arc welding for example, with a thick end plate 38. The width of plate 38 corresponds to that of the enlarged part of the flanges 37 (at the point of union) and to the available space between the central flanges of the body uprights 13, so that said plate can be applied, over its entire top, against the outer flanges 13' of said uprights. The flanges 13' are welded to a stay plate 39, the sides of which may be folded over for greater rigidity, to which stay plate there may be welded the corrugations of the outer corrugated sheet metal panel 14, or which may be of any other relatively thin sheet metal, reinforced locally or not by corrugations, by suitably connected members or other means. As shown particularly on Fig. 2, the different members are mounted in final assemblage by means of rivets passing through said parts.

The insertion of the stay plate 39, which is welded, on the one hand, to the outer flanges 13' of uprights 13 and, on the other, to the outer panel 14, produces considerable reinforcement of the body part to which the beam 35 is connected by means of its end plate 38 and of its rivets 40, through which excellent distribution of the forces is obtained.

In the modification shown on Fig. 3, in which similar reference numbers designate similar parts described with respect to Figs. 1 and 2, the stay plate 39' is interposed between the end plate 38 of the beam 35 and the outer flanges 13' of the uprights 13 to which it is welded to reinforce said flanges at the points at which the rivet holes are found. By reason of the characteristic conformation shown on the drawings this stay plate may also be welded to the outer panel 14.

It is obvious that the method of connecting the pivot beam ends with the sides as described and illustrated on the accompanying drawings is given by way of example only and that the invention is not limited thereto, and that the connection may be modified as desired, in detail, without exceeding the scope of the invention.

What I claim is:

1. A joint construction for connecting the end of a transverse beam to the side wall of a lightweight vehicle body comprising a side wall having vertical flanged uprights and an outer sheathing secured thereto, two of the uprights entering into the joint having outer flanges extending toward each other and a stay plate bridging the outer flanges of these uprights and overlapping and secured to them and to the sheathing, the transverse beam having its end portion formed by a flat plate which overlaps in the assembly the outer flanges of the posts and the portions of the stay plate and sheathing in overlapping relation with said flanges, and common securing means for securing all said overlapping parts together in the final assembly, the stay plate extending some distance beyond the flat end plate and being secured to the sheathing in said extended region.

2. A joint construction according to claim 1 in which the stay plate is extended laterally beyond the uprights and further secured to the sheathing in said extended portions.

3. A joint construction according to claim 1 in which the transverse beam is of I cross section having the flanges thereof widened at the ends and the flat plate is substantially coextensive with said widened ends and rigidly secured to the widened flanges and web.

4. A joint construction according to claim 1 in which the uprights, stay plate and sheathing are secured together by welding prior to final assembly and the beam is secured to the overlapping portions of these parts in final assembly by riveting.

5. A joint construction according to claim 1 in which the stay plate is interposed between the uprights and sheathing and welded to each.

6. A joint construction according to claim 1 in which the stay plate is welded between the uprights to the sheathing and has its lateral edges offset the thickness of the upright flanges and interposed in final assembly between the upright flanges and the flat end plate on the transverse beam.

7. A joint construction according to claim 1 in which the sheathing is longitudinally corrugated.

8. A joint according to claim 1 in which the stay plate is welded between the uprights to the sheathing and has its lateral edges offset the thickness of the upright flanges and interposed in final assembly between the upright flanges and the flat end plate on the transverse beam, the portion of the stay plate between the offsets being extended upwardly and downwardly beyond the flat end plate for more extensive overlap and securement to the sheathing.

WALTER B. DEAN.